June 20, 1944.        D. W. HOPKINS        2,351,613
THREE-WAY VALVE
Filed July 6, 1942        2 Sheets-Sheet 2
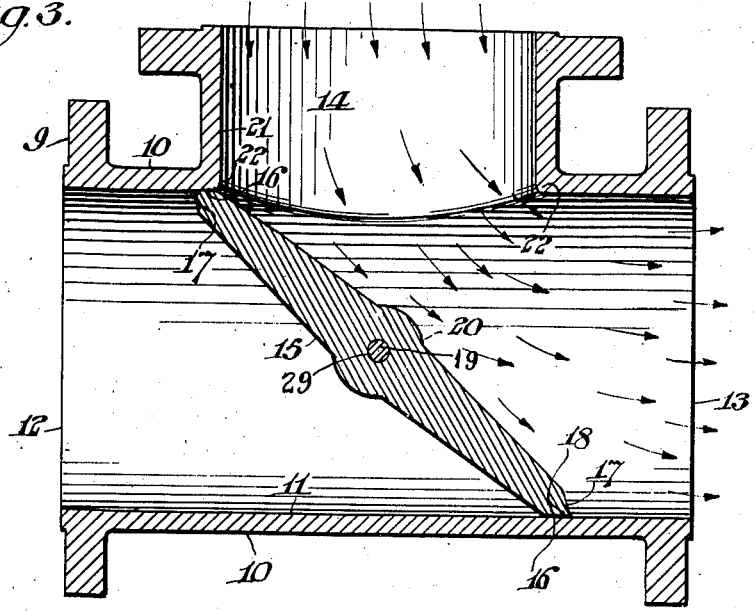
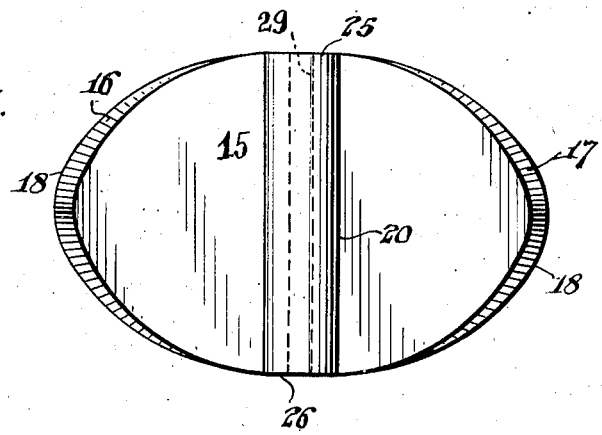
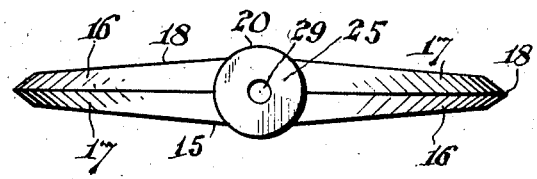
INVENTOR:
David W. Hopkins,
BY Barr, Borden + Fox
ATTORNEYS.

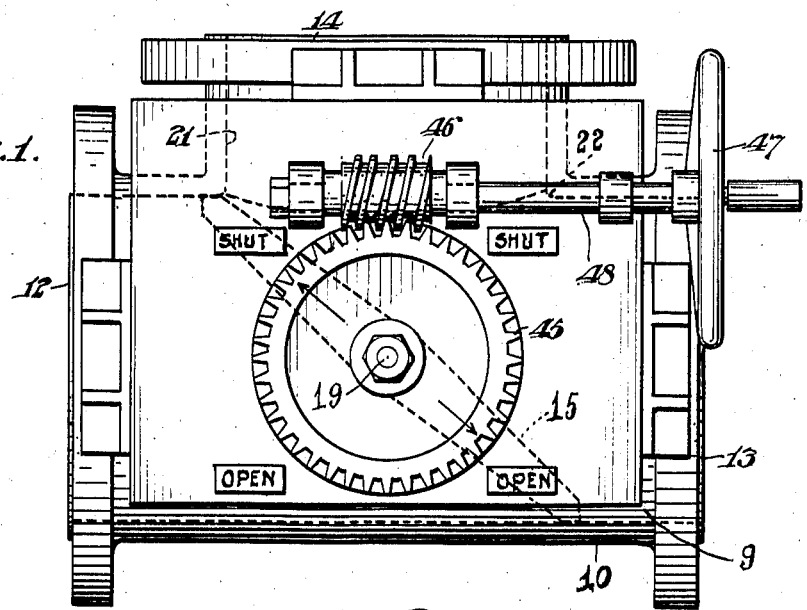

Patented June 20, 1944

2,351,613

UNITED STATES PATENT OFFICE 2,351,613

THREE-WAY VALVE

David W. Hopkins, Philadelphia, Pa.

Application July 6, 1942, Serial No. 449,935

3 Claims. (Cl. 251—14)

This invention relates to three-way valves.

In the past most valves of this category were of the rotary plug type requiring very accurate machining both of the plugs and the seats for tight sealing, they wore rapidly and developed leaks, they developed dangerous cavitation effects within the valve resulting in rapid erosion and leakage, they were expensive to manufacture and in most cases were incapable of balanced mounting so that the differential pressures incident on the plug exerted binding pressures transversely thereof, to militate against ease of operation.

It is among the objects of this invention; to simplify the construction of valves; to provide a three-way valve controlled by a butterfly vane; to provide a three-way valve of simplicity and ease of construction; to provide a three-way valve which is leakproof even under prolonged use; to provide a valve obviating the defects of the prior art; to provide a valve having three ports adjustable to alternately coupled paired relationship by means of a butterfly vane; to provide a three-way valve the flow passages of which are free and clear of abrupt turns and constrictions; to provide a three-way valve in which internal friction losses are minimized; to provide a three-way valve with a movable control vane which is substantially balanced for easy manipulation substantially regardless of the pressures incident upon the vane; to provide an oval vane in a generally cylindrical valve housing the edges of which are so machined and shaped as to be tight in each sealed position of the vane; to provide a vaned three-way valve which is substantially leakproof about the pivot of the vane. Many other objects and advantages will become more apparent as the description proceeds.

In the accompanying drawings,

Fig. 1 represents a top plan of the valve according to a preferred embodiment.

Fig. 2 represents a fragmentary section through the axis of the vane, showing the leak-proof bushing and boss arrangement of vane and valve housing.

Fig. 3 represents a section through the vane and housing transverse of the vane, showing a possible fluid flow by arrows on one side of the vane.

Figs. 4 and 5 represent respectively a side elevation and a top plan of the preferred form of vane.

In the simplest essence, the invention is preferably embodied in a valve housing having a main fluid entrance port perpendicular to the axis of the housing, with oppositely directed exit apertures in the housing at opposite ends thereof concentric with said axis and symmetrically spaced relative to the entrance port, with a double edged butterfly vane of oval contour mounted on an axis symmetrical of the entrance port and normal both to the axis of said port and to the axis of the housing, and movable to alternately couple the respective exit apertures to the entrance port.

Referring to Fig. 3, the housing 9 comprises a cylindrical sleeve conduit, or body 10, having the internal seating surface 11 terminating at one end in the preferably, but clearly not essentially, flanged exit 12, and at the other in the similarly finished exit 13. The internal bore or seating portion 11 of the body may be machine finished or bored for smoothness of the surface to facilitate the seating of the butterfly vane, to be described, as well as to reduce frictional losses in the passages. An entrance port 14 is defined by a short cylindrical sleeve extension portion 21 of the body 10, the axis of which is normal to the axis of the cylindrical body 10, and preferably is of substantially the same diameter as bore 11. Obviously, the terms entrance and exit as used above are arbitrary terms and not limitative, as the functional entrance may be either of the exit openings and the entrance port may be a functional exit, all depending upon the purpose and operative associations of the valve, with the feeder and exit or exhaust lines.

A compound vane 15, having generally smooth side walls, and being slightly oval in transverse profile, has the carefully ground or machined inclined sealing surfaces respectively 16 and 17, around the outer periphery 18, extending between the terminal planar surfaces 25 and 26 of the axially apertured boss 20. The vane is pivoted by a shaft or shafts 19 anchored in the aperture 29 of the boss 20. The exposed ends 25 and 26 of boss 20, as indicated in Figs. 2 and 5 are machined and polished in a plane normal to the axis of the vane, merging generally tangentially into the periphery 18, as the only breaks in the continuity of the periphery which otherwise is provided throughout with the suitably inclined sealing surfaces described.

The short axial sleeve extension portion 21 defining entrance port 14 is inwardly prolonged to meet the transverse surface 11 of the body 10 in the internal rounded corner 22. It will be clear, as shown in Fig. 3, that with the vane 15 in the position shown, the fluid entering port 14 through conduit 21, will be caused to flow through a slightly constricted path and will be slightly accelerated thereby in passing between the rounded corner 22 and the surface of the vane 15 and boss 20 if this is continuous across the vane as shown, as obviously, only short diametrically spaced bosses are necessary. As this is the only constriction in the valve however, and as most of the energy is reconverted as the passage enlarges beyond the vane, the friction losses are small, and the efficiency of the valve is high.

In order to afford enough material of the vane for the angularly divergent sealing surfaces thereof, the vane must be appreciably heavier than usually is the case with a butterfly valve for the conventional open and shut two-way variety.

It is of further importance that the vane be mounted in a sealed or leak-proof disposition in the valve housing, and to this end the valve casing 10 is provided both at the top and at the bottom as well, with diametrical apertures 23, within each of which a bushing 24 having the normal plane end 27 is provided, with the face 27 forming a chord of the periphery of the cylindrical surface 11, in a plane normal to the axis of the cylinder 11, while forming a slight step or shoulder transversely thereto. The vane boss 20 is aligned with each of the bushings so that the upper surface 25 and lower surface 26 thereof each have a tight bearing sealing engagement with the juxtaposed bushing in all adjusted positions of the valve vane. The peripheral edge 18 engages an oval path in the cylinder 11 in the two adjusted positions of the vane, between the seat-mergent bushings.

The shaft 19 may extend through the vane and beyond it to a degree adequate to permit it to seat in the lower bushing, but at the upper end it is prolonged to a length sufficient to enable dissipation of heat to which it may be subjected from the conditions of use or of the fluid passing through the valve. Thus, at the upper end the shaft 19 is rotatable in the bushing 24, and the latter has a flange 30 overhanging the barrel or body 10 adjacent to the aperture 23. The flange 30 may have a more or less short axial flange portion 31 spaced from the shaft 19 in position to be engaged and held down by the finned housing 32. The latter is axially bored as at 33 so as to permit rotation of the shaft 19, has the downwardly presenting enlarged recess 33¹ including the shoulder 34 engaging the flange 31, and has the laterally extending anchoring flange 35 provided with cast bosses 36 so that suitable tie down bolts or screws 39 may pass through the flange 35 into barrel or body 10 to draw the housing against sealing compound or packing 37. The barrel of the housing 32 has a series of cooling fins 38 to dissipate heat. The barrel of the housing toward the upper end is formed as a stuffing box with a packing receiving recess 40 in which packing 41 is compressed by a gland 42 pulled toward the packing by suitable bolts 47 engaging the terminal flanges 43 on the housing 32, and 44 on the gland 42, as is conventional.

Shaft 19 projects beyond the end of the gland and preferably carries a worm wheel or the like 45 in mesh with a worm gear 46, and the latter is actuatable by a power apparatus such as hydraulic or electric power, or by the hand wheel 47 driving shaft 48.

It will be clear that the degree of movement necessary to change the vane from one sealed position to the other is very small indeed, especially in contrast to conventional plug devices, and that the pressures will be effective on the entire face of the vane so that substantial balance on each side of the boss 20 will be secured to facilitate vane manipulation, and the flow through the three-way valve will be subject to a minimal drag and frictional losses.

Having thus described my invention, I claim:

1. In a three way valve a butterfly vane comprising a vane body having an oval profile and having a long and a short axis, said body having a pair of diametrically extending apertured boss portions concentric with the short axis, the boss portions having plane ends normal to the axis thereof, and the periphery between boss plane portions being formed of intersecting angularly inclined sealing surfaces.

2. In a three way valve, a body having a cylindrical valve seat, a pair of aligned apertures extending diametrically of the cylindrical valve seat, a pair of bushings having plane ends and mounted in the respective apertures so that their plane ends form a chord of the cylindrical valve seat, a vane disposed in the cylindrical valve seat and having a pair of aligned diametrically opposed boss ends with plane faces juxtaposed to the ends of the bushings, and means for pivotally supporting and actuating the vane through a bushing, said vane having angularly divergent machined surfaces extending peripherally from and between the plane faces arranged to seat sealingly against the cylindrical valve seat in two different angular vane dispositions substantially without leakage adjacent the pivot of the vane.

3. In a three way valve, a body having a cylindrical valve seat, a pair of aligned apertures extending diametrically of the cylindrical valve seat, a pair of bushings having plane ends and mounted in the respective apertures so that their plane ends form a chord of the cylindrical valve seat, a vane disposed in the cylindrical valve seat and having a pair of aligned diametrically opposed boss ends with plane faces juxtaposed to the ends of the bushings, said vane having angularly divergent machined surfaces extending peripherally from and between the plane faces arranged to seat sealingly against the cylindrical valve seat in two different angular vane dispositions substantially without leakage adjacent the pivot of the vane, said body having also a lateral apertured extension substantially perpendicular to and symmetrical of the vane pivot arranged to be placed selectively in communication with one or the other of the said aligned apertures according to the selected angular vane disposition in the cylindrical body.

DAVID W. HOPKINS.